United States Patent
Weckerle et al.

(10) Patent No.: US 10,550,805 B2
(45) Date of Patent: Feb. 4, 2020

(54) RESPONSE TIME BALANCER

(71) Applicant: MANN+HUMMEL GMBH, Ludwigsburg (DE)

(72) Inventors: Rick Weckerle, Kalamazoo, MI (US); Jaime Douglas Buikema, Vicksburg, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 290 days.

(21) Appl. No.: 15/219,486

(22) Filed: Jul. 26, 2016

(65) Prior Publication Data

US 2018/0030940 A1    Feb. 1, 2018

(51) Int. Cl.
*F02M 35/10* (2006.01)
*F16L 41/02* (2006.01)

(52) U.S. Cl.
CPC ..... *F02M 35/10262* (2013.01); *F16L 41/021* (2013.01)

(58) Field of Classification Search
CPC ............. F02M 35/10262; F16L 41/021; F16L 55/027; Y02T 10/146
See application file for complete search history.

(56) References Cited

U.S. PATENT DOCUMENTS

| | | | |
|---|---|---|---|
| 3,752,450 A * | 8/1973 | Charron | F02M 3/062 123/DIG. 11 |
| 5,127,370 A | 7/1992 | Suzuki | |
| 5,715,782 A | 2/1998 | Elder | |
| 6,293,247 B1 | 9/2001 | Sasaki | |
| 2014/0123921 A1* | 5/2014 | Hanshaw | F02D 13/0215 123/90.17 |
| 2016/0369753 A1* | 12/2016 | Kang | F02M 35/104 |

* cited by examiner

*Primary Examiner* — Grant Moubry
*Assistant Examiner* — Ruben Picon-Feliciano
(74) *Attorney, Agent, or Firm* — James Hasselbeck

(57) ABSTRACT

The present disclosure relates to various apparatus for controllably restricting an air flow to a vacuum controlled actuator in a vehicle induction system for the purpose of controlling a response of the actuator. In one embodiment the apparatus is a hose component having a hose that forms a flow channel, and which has an air flow restrictor seated within the flow channel. The air flow restrictor has a main body portion and an end wall having a reduced diameter air flow aperture. The air flow restrictor restricts air flow through the hose by a predetermined degree to tailor a response of the actuator in flow communication with the hose.

6 Claims, 5 Drawing Sheets

RESPONSE TIME BALANCER

FIELD

The present disclosure relates to induction systems used on motor vehicle engines having a pair of cylinder banks, and more particularly to a pneumatic circuit that makes use of a flow restrictor for use with an air intake manifold, and where the flow restrictor equalizes the response time between the left and right cylinder banks of the engine without the need to use a pair of vacuum solenoids valves.

BACKGROUND

The statements in this section merely provide background information related to the present disclosure and may not constitute prior art.

It is desirable to equalize the response time of the Charge Motion Control Valves (CMCV) between two cylinder banks of an internal combustion engine used with present day motor vehicles. One solution has been to use two separate vacuum actuator solenoid valves in the pneumatic circuit associated with the CMCV on the intake manifold of the engine. The use of two separate vacuum actuator solenoid valves, one for each cylinder bank, allows the response time of the CMCV for the two cylinder banks to be equalized. As should be apparent, however, this solution requires not only the use of two independent vacuum actuator solenoid valves in the engine's induction system, but also requires the use of an extra steel bracket for mounting the second solenoid valve, one or more added hoses, as well as the need for packaging space in or around the intake manifold to mount the second solenoid valve.

Accordingly, a mechanism by which the response time between the CMCV for the two cylinder banks can be balanced, while potentially eliminating the need for a second vacuum actuator solenoid valve, would be highly advantageous.

SUMMARY

In one aspect, the present disclosure relates to a hose component for controllably restricting air flow in a vehicle induction system to an actuator associated with one cylinder bank of a vehicle engine. The hose component may comprise a hose forming a flow channel, and an air flow restrictor seated within the flow channel. The air flow restrictor may include a main body portion and an end wall having a reduced diameter air flow aperture. The air flow restrictor restricts air flow through the hose by a predetermined degree to tailor a response of the actuator in flow communication with the hose.

In another aspect, the present disclosure relates to a T-fitting component for controllably restricting air flow in a vehicle induction system to at least one actuator associated with the CMCV for the one cylinder bank of a vehicle engine, The T-fitting component may comprises a first port in air flow communication with a vacuum source, and a second port in air flow communication with the first port and with a first actuator associated with a first cylinder bank of the vehicle engine. The T-fitting component may also include a third port in communication with the first and second ports. The third port may be in air flow communication with a second actuator associated with the CMCV for the second cylinder bank of the vehicle engine. At least one of the second and third ports may include an air flow restrictor therein for restricting airflow therethrough, to thus tailor a response of an associated one of the first or second actuators.

In still another aspect, the present disclosure relates to a vacuum controlled actuator for use in a vehicle induction system and being operably associated with one of the CMCV for the first and second cylinder banks of a vehicle engine. The actuator may comprise a cover having an air flow inlet port formed therein, and an air flow restrictor. The air flow restrictor may be formed within the air flow port. The air flow restrictor may include an internal wall portion having a reduced diameter aperture for restricting air flow through the air flow inlet port.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
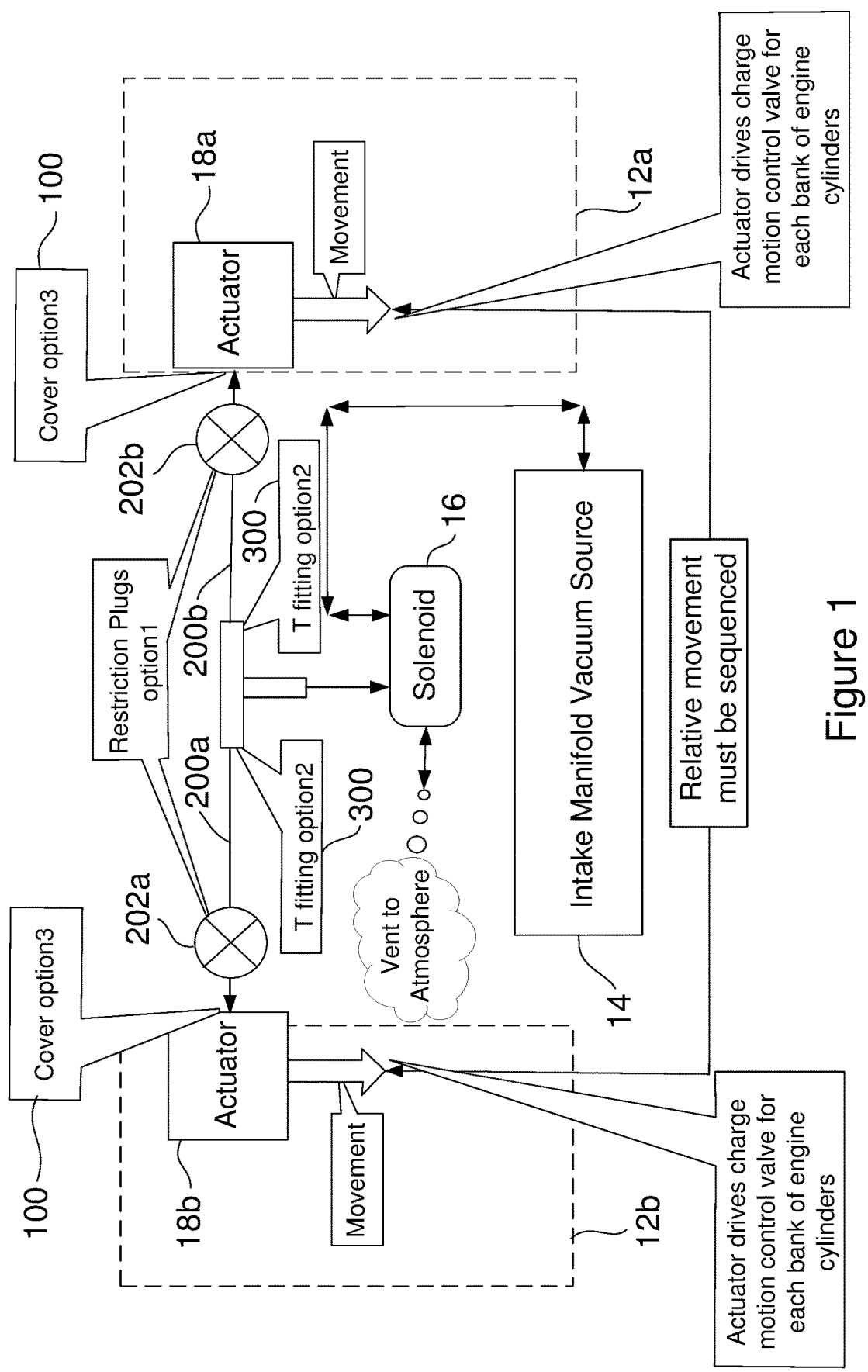
FIG. 1 is a high level diagram illustrating a plurality of locations that a flow restrictor of the present disclosure may be located at to achieve the needed response time balancing for the movement of actuators associated with the CMCV for the two cylinder banks of an internal combustion engine.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a highly simplified schematic diagram 10 illustrating a portion of an induction system for a motor vehicle. In this example the vehicle engine has two cylinder banks 12a and 12b. An intake manifold 14 is used to provide intake air to the combustion chambers of the two cylinder banks 12a/12b, as well as to provide a vacuum source 14, via a vacuum actuator solenoid valve 16, which assists in controlling independent actuators 18a and 18b. Actuators 18a and 18b are used for the control of the movement and modulating position of the CMCV for each bank of engine cylinders. Typically, the actuators may be vacuum or pressure actuated diaphragm and/or piston actuators. The vacuum source may advantageously be from the intake manifold of the engine.

Figure 2:
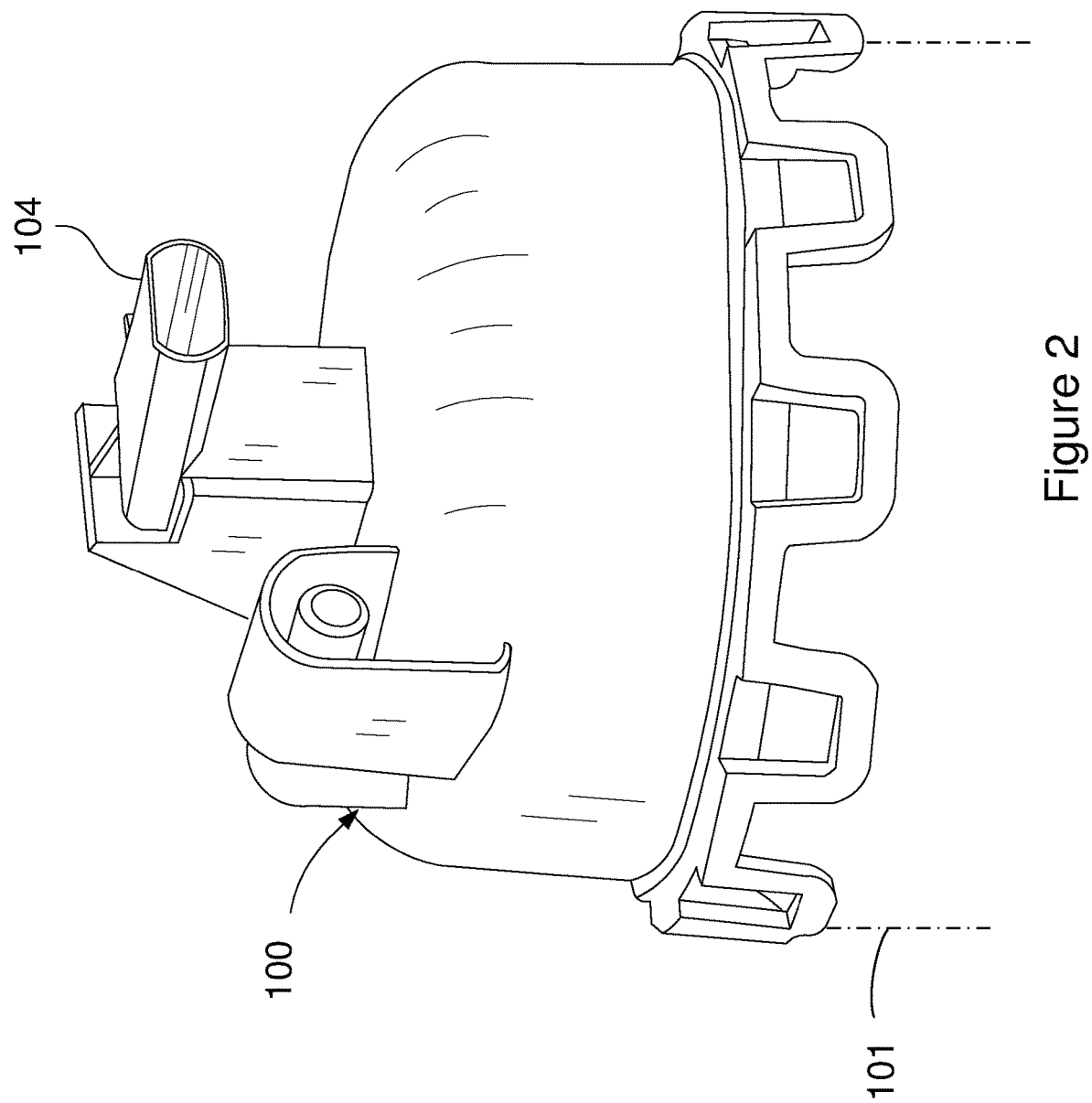
FIG. 2 is a perspective view of one embodiment of the present disclosure in which a flow restrictor is integrally incorporated into an actuator cover of each of the two actuators shown in FIG. 1.
Figure 3:
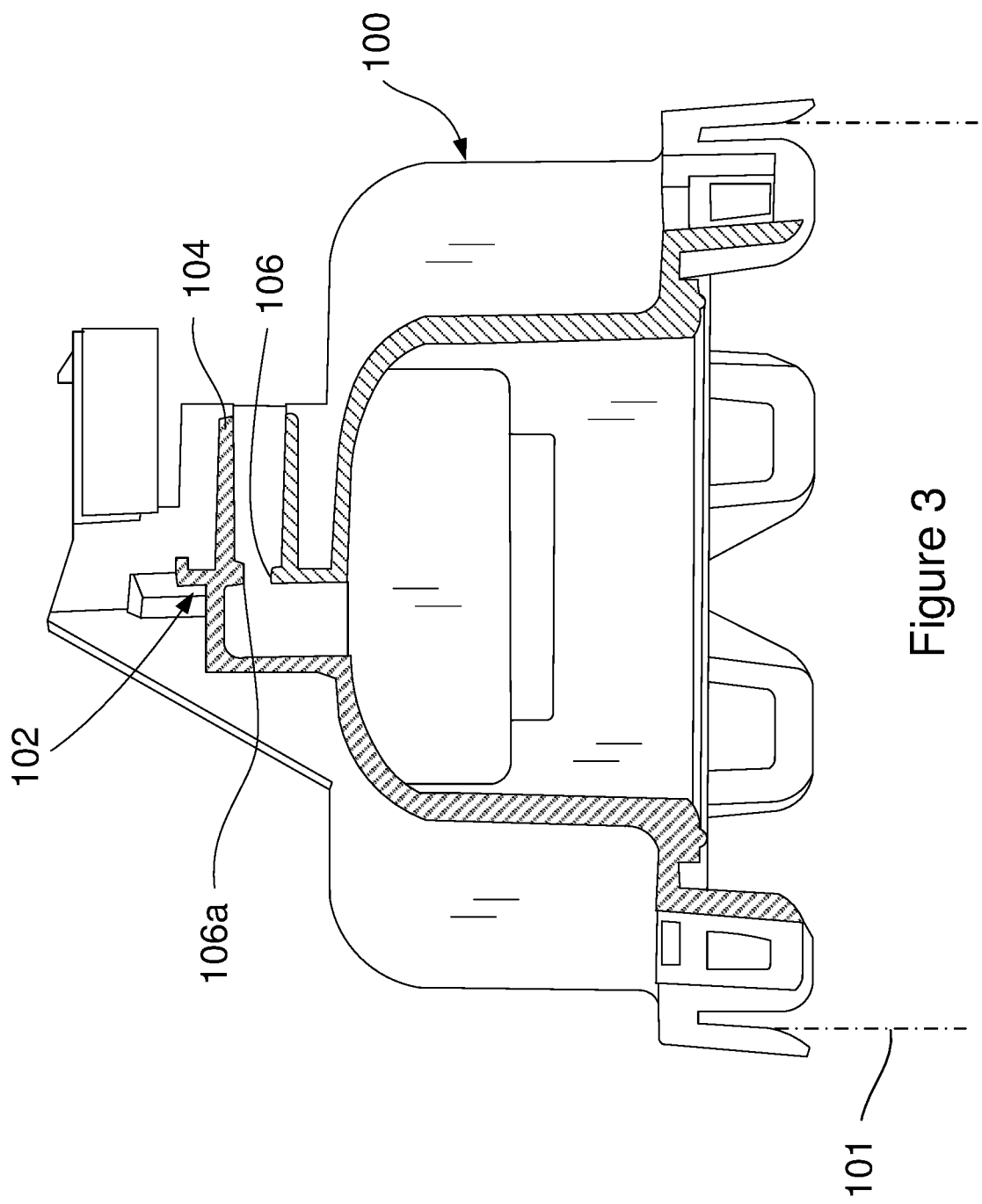
FIG. 3 is a simplified side cross-sectional view of the actuator cover shown in FIG. 2 showing the flow restrictor in greater detail.

The flow restrictor of the present disclosure can be implemented in a plurality of different embodiments. FIGS. 2 and 3 show one such embodiment in which an actuator 101 of the present disclosure includes an actuator cover 100 having an internal flow restrictor 102 (visible only in FIG. 3) in communication with an inlet port 104. The flow restrictor 102 includes an internal wall 106 having a reduced diameter aperture 106a that forms a restriction of a predetermined cross-sectional area. While the flow restrictor 102 is integrally formed within the actuator cover 100, it is possible that the flow restrictor could form a separate component that is inserted into the inlet port 104 and mechanically secured (e.g., by adhesives or fasteners) therein. The cover 100 in one embodiment is manufactured form plastic as a single piece component with the restrictor 100 located within the air flow inlet port 104.

The airflow through the restrictor 102 thus affects how rapidly it's associated actuator 18a or 18b responds, and advantageously can have apertures configured to coordinate and synchronize movement and modulation of the CMCV for each bank of engine cylinders such the valves move and are positioned in unison. In this manner, the response of each actuator 18a and 18b can be controlled so that the two actuators are synchronized in operation to achieve coordinated movement of the CMCV.

Figure 4:
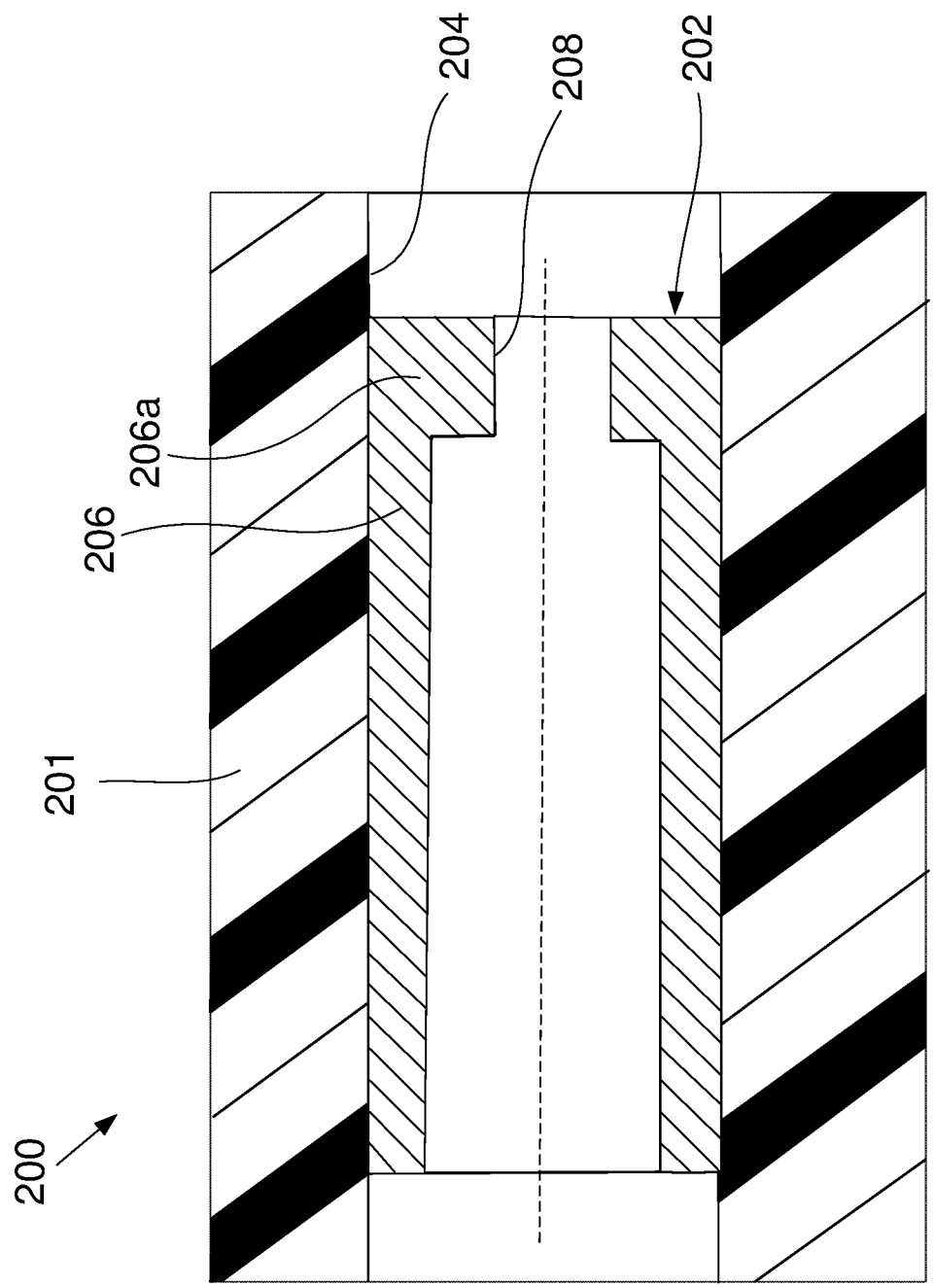
FIG. 4 is a cross-sectional side view of another embodiment in accordance with the present disclosure where a flow restrictor is incorporated in a hose leading to one of the actuators shown in FIG. 1, and with the understanding that a flow restrictor such as shown in FIG. 4 is placed in each of the two hoses leading to the two actuators.

FIG. 4 shows a hose component 200 in accordance with another embodiment of the present disclosure. The hose component 200 in this embodiment includes a hose 201 and an air flow restrictor 202 inserted into an interior flow channel 204 of the hose 201. In this embodiment an outer diameter of the flow restrictor 202 should be sized just slightly larger than the diameter of the flow channel 204 so that insertion of the flow restrictor 202 can be accomplished within the flow channel 204, but that the flow restrictor, once inserted, will remain stationary within the flow channel 204. The hose component 200 may be any type of flexible hose typically used in vehicle induction systems, for example a rubber hose, an elastomeric hose, or a hose made from any other form of resilient material suitable for automotive engine applications.

The flow restrictor 202 in FIG. 4 includes a main body portion 206 having an end wall 206a at one end with a reduced diameter air flow aperture 208. The main body portion 206 may be made from a suitable plastic, from steel, aluminum or any other suitably rigid material. It is anticipated, however, that a particularly desirable implementation of flow restrictor 202 will have the main body portion 206, the end wall 206a and the reduced diameter aperture 208 molded as a single piece plastic component.

The precise diameter of the reduced diameter aperture 208 is selected so that the flow restrictor 202 will reduce air flow through the hose 201 sufficiently to equalize the response of the two actuators 18a and 18b. As such, the flow restrictor 202 will be located in separate hoses leading to the two actuators 18a and 18b. As shown in simplified diagrammatic form in FIG. 1, two flow restrictors 202a and 202b are illustrated located within a pair of the hose components 200a and 200b, respectively, to control the vacuum air flow being used to actuate the actuators 18a and 18b.

Figure 5:
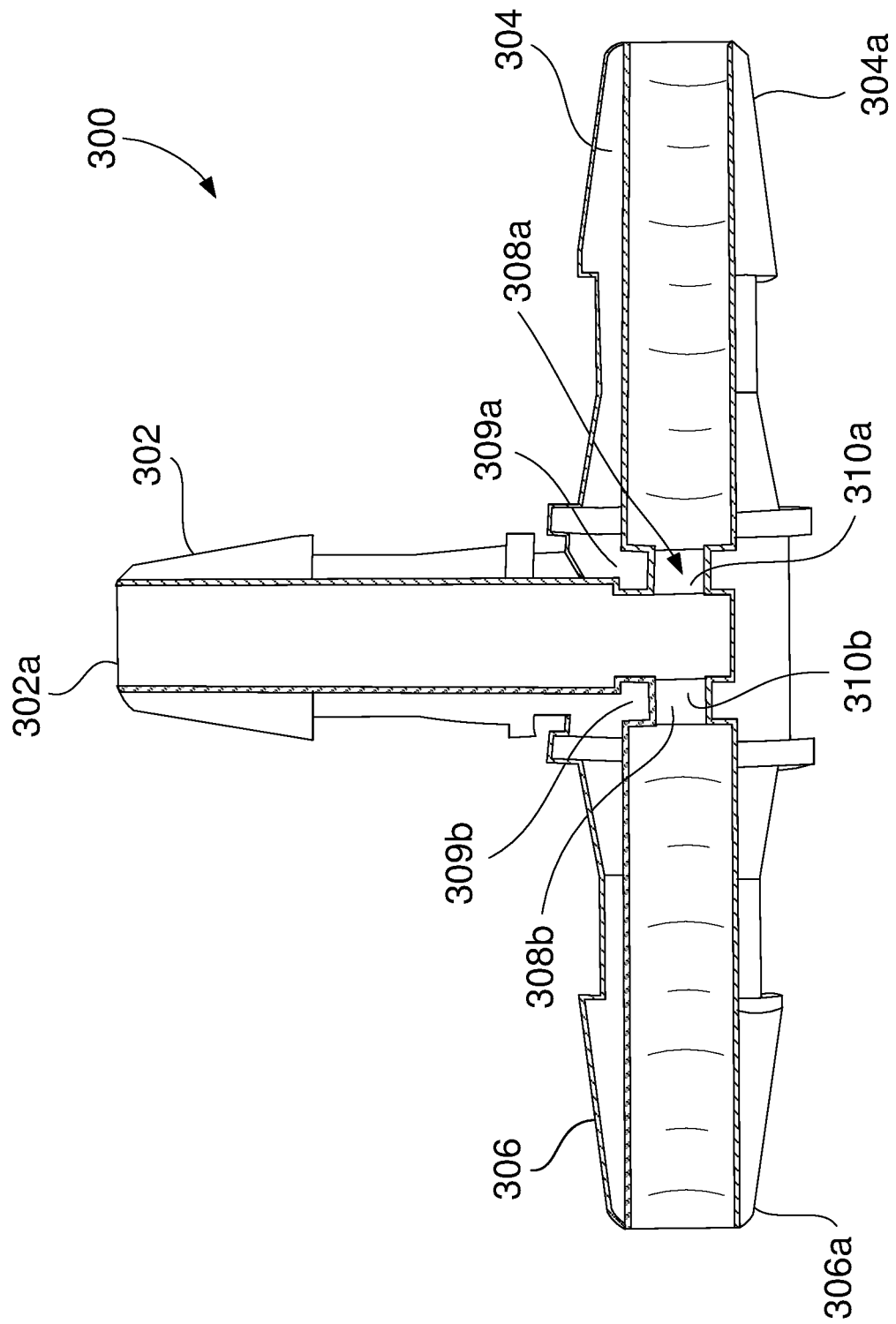
FIG. 5 is a cross-sectional side view of another embodiment of the present invention in which flow restrictors are integrally formed in each branch of a T-fitting, and thus are able to restrict flow to separate hoses leading to the two actuators shown in FIG. 1.

Referring to FIG. 5, a T-fitting component 300 in accordance with a third embodiment of the present disclosure is shown. The T-fitting component 300 may be made from a suitably strong plastic, from metal, from aluminum or any other material suitable for use in an automotive vehicle engine environment. However, it is anticipated that the T-fitting component 300 will in most instances be molded as a single piece component part from high strength plastic.

The T-fitting component 300 includes a first port 302, a second port 304 and a third port 306, all in flow communication with one another. A first flow restrictor 308a is formed in the second port 304 and a second flow restrictor 308b is formed in the third port 306. In this example the flow restrictors 308a and 308b are shown formed close to an internal intersection of the three flow paths associated with the ports 302/304/306, although they need not be formed close to the internal intersection. Instead, the flow restrictors 308a and 308b could be formed closer to distal ends 304a and 306a of the ports 304 and 306, respectively.

The flow restrictors 308a and 308b are shown molded as integral internal portions of the T-fitting component 300. In this form the flow restrictors 308a and 308b include walls 309a and 309b each having reduced diameter apertures 310a and 310b, respectively. The reduced diameter apertures 310a and 310b form flow restrictions that each have a precise cross-sectional flow area needed to balance the operation of the actuators 18a and 18b.

It is also possible that the flow restrictors 308a and 308b could be formed as a single, separate component, and then inserted into either of ports 304 or 306 to the point of intersection of the three ports 302-306. It would be important that the flow restrictor in such an embodiment, which would be similar to the flow restrictor 202 shown in FIG. 4, is securable at the intersection of the three ports 302-306, and this could be accomplished by a pin or other suitable means that extends through a portion of the T-fitting component 300 and engages the flow restrictor to hold it precisely in place.

The various embodiments of the present disclosure all provide a means for balancing the response of a pair of actuators associated with a pair of CMCV for the cylinders of a motor vehicle engine, and which are both dependent on a single source for a vacuum airflow. The various embodiments described herein all enable a single solenoid valve to be used with the vehicle's intake manifold. This reduces cost, assembly complexity, weight, and further is expected to enhance overall reliably of a vehicle induction system. The various embodiments of the present disclosure free up space within the engine compartment and help to de-clutter the engine compartment.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A pressure or vacuum controlled actuator for operating a valve associated with one cylinder bank of a vehicle engine, comprising:
    an actuator cover forming a portion of and enclosing a portion of a pressure/vacuum chamber arranged in an interior of the pressure or vacuum controlled actuator;
    an inlet port member formed directly on and formed in one piece together with the actuator cover, the inlet port member having
        a first end arranged in the pressure/vacuum chamber at an interior of the actuator cover;
        a second end arranged at an exterior of the pressure or vacuum controlled actuator; and an inlet passage extending from the first end to the second end of the inlet port member, the inlet passage conducting pressure or vacuum through the actuator cover into the pressure/vacuum chamber to operate the actuator, the inlet passage of the inlet port member having an inside diameter;

a response tailoring air flow restrictor having an outside diameter smaller than the inside diameter of the inlet passage of the inlet port member, the air flow restrictor sized to be insertable into an interior of the inlet passage, the air flow restrictor having a reduced diameter aperture of a predetermined cross-sectional area, the predetermined cross-sectional area sized to restrict flow in the inlet port member to tailor the response of the actuator;

wherein the air flow restrictor, after insertion, is secured into the interior of the inlet passage by an adhesive;

wherein the reduced diameter aperture of the separate response tailoring air flow restrictor is sized to tailor a response of the actuator to a pressure or vacuum applied at the inlet port member, such that the pressure or vacuum controlled actuator is configured to position and move in unison with other pressure or vacuum controlled actuators of the vehicle engine.

2. The pressure or vacuum controlled actuator according to claim 1, wherein
the actuator cover, and the inlet port member are unitary, formed together with in one piece from a plastic material.

3. An air induction system for a motor vehicle comprising:
a first pressure or vacuum controlled actuator for operating a valve associated with a first cylinder bank of a vehicle engine, comprising:
  a first actuator cover forming a portion of and enclosing a portion of a first pressure/vacuum chamber arranged in an interior of the pressure or vacuum controlled actuator;
  a first inlet port member formed directly on and formed in one piece together with the first actuator cover, the first inlet port member having
    a first end arranged in the first pressure/vacuum chamber at an interior of the first actuator cover;
    a second end arranged on an exterior of the first actuator cover of the first pressure or vacuum controlled actuator; and
    a first inlet passage extending from the first end to the second end of the first inlet port member, the first inlet passage conducting pressure or vacuum through the first actuator cover into the first pressure/vacuum chamber to operate the first pressure or vacuum controlled actuator;
a first response tailoring air flow restrictor is a separate component, having an outside diameter smaller than an inside diameter of the first inlet passage of the first inlet port member, the first response tailoring air flow restrictor sized to be insertable into an interior of the first inlet passage, the first response tailoring air flow restrictor having a reduced diameter aperture of a predetermined cross-sectional area, the predetermined cross-sectional area sized to restrict flow in the first inlet port member to tailor the response of the first actuator;
wherein the first response tailoring air flow restrictor, after insertion, is secured into the interior of the first inlet passage by an adhesive;

a second pressure or vacuum controlled actuator for operating a second valve associated with a second cylinder bank of the vehicle engine, comprising:
  a second actuator cover forming a portion of and enclosing a portion of a second pressure/vacuum chamber arranged in an interior of the second pressure or vacuum controlled actuator;
  a second inlet port member formed directly on and formed in one piece together with the second actuator cover, the second inlet port member having
    a first end arranged in the second pressure/vacuum chamber at an interior of the second actuator cover;
    a second end arranged on an exterior of the second actuator cover of the second pressure or vacuum controlled actuator;
    a second inlet passage extending from the first end to the second end of the second inlet port member, the second inlet passage conducting pressure or vacuum through the second actuator cover into the second pressure/vacuum chamber to operate the second pressure or vacuum controlled actuator;
wherein a single pressure/vacuum source signal is supplied to the inlet port members of both first pressure or vacuum controlled actuators together,
wherein the reduced diameter aperture of the first response tailoring air flow restrictor is sized to tailor a response of the first actuator to the single pressure or vacuum signal applied at both the first and second inlet port members, to coordinate and synchronize movement and modulation of the first and second pressure or vacuum controlled actuators to act together in unison.

4. The air induction system according to claim 3, wherein the first actuator cover, and the first inlet port member are unitary, formed together with in one piece from a plastic material.

5. The air induction system according to claim 3, wherein the second inlet port member includes
  a second response tailoring air flow restrictor having an outside diameter smaller than an inside diameter of the second inlet passage of the second inlet port member, the second air flow restrictor sized to be insertable into an interior of the second inlet passage, the second response tailoring air flow restrictor having a reduced diameter aperture of a predetermined cross-sectional area, the predetermined cross-sectional area sized to restrict flow in the second inlet port member to tailor the response of the second actuator;
  wherein the second response tailoring air flow restrictor, after insertion, is secured into the interior of the second inlet passage by an adhesive;
  wherein the reduced diameter aperture of the second response tailoring air flow restrictor is sized to tailor a response of the second actuator to a pressure or vacuum applied at the second inlet port member.

6. The pressure or vacuum controlled actuator according to claim 5, wherein
the diameters of the reduced diameter apertures of the first and second pressure or vacuum controlled actuators are sized to coordinate and synchronize movement and modulation of the pressure or vacuum controlled actuators such that the first and second pressure or vacuum controlled actuators are tailored to move and position together in unison.

* * * * *